(12) United States Patent
Suzuki et al.

(10) Patent No.: US 9,137,243 B2
(45) Date of Patent: Sep. 15, 2015

(54) AUTHENTICATION SYSTEM AND AUTHENTICATION METHOD

(71) Applicants: Field System, Inc., Tokyo (JP); Information Services International-Dentsu, Ltd., Tokyo (JP)

(72) Inventors: Hiroshi Suzuki, Tokyo (JP); Ichiro Okuyama, Tokyo (JP); Takashige Tsukuma, Tokyo (JP); Yoshimaru Maruno, Tokyo (JP); Hiroaki Matsushima, Tokyo (JP)

(73) Assignees: Field System, Inc., Tokyo (JP); Information Services International-Dentsu, Ltd., Tokyo (JP)

( * ) Notice: Subject to any disclaimer, the term of this patent is extended or adjusted under 35 U.S.C. 154(b) by 128 days.

(21) Appl. No.: 14/106,838

(22) Filed: Dec. 15, 2013

(65) Prior Publication Data

US 2014/0109211 A1 Apr. 17, 2014

Related U.S. Application Data (63) Continuation-in-part of application No. PCT/JP2012/063247, filed on May 24, 2012.

(30) Foreign Application Priority Data

Jun. 15, 2011 (JP) .................................. 2011-132764

(51) Int. Cl.
  *H04L 29/06* (2006.01)
  *G06F 21/35* (2013.01)
  (Continued)

(52) U.S. Cl.
  CPC ............ *H04L 63/0838* (2013.01); *G06F 21/35* (2013.01); *G06Q 20/385* (2013.01);
  (Continued)

(58) Field of Classification Search
  None
  See application file for complete search history.

(56) References Cited

U.S. PATENT DOCUMENTS 6,957,185 B1 * 10/2005 Labaton .................. 704/500
8,645,708 B2 * 2/2014 Labaton .................. 713/184
(Continued)

FOREIGN PATENT DOCUMENTS

JP 2002-259344 A 9/2002
JP 2009-193272 A 8/2009
(Continued)

OTHER PUBLICATIONS

International Search Report (PCT/ISA/210) in International Application No. PCT/JP2012/063247, of which the present application is a "bypass" continuation-in-part.
(Continued)

*Primary Examiner* — Michael R Vaughan
(74) *Attorney, Agent, or Firm* — JTT Patent Services, LLC; Gerald T. Peters (57) ABSTRACT

An authentication system 1 that uses sound to transmit one-time password(s) may be equipped with portable terminal(s) 10, authentication terminal(s) 30, and authentication server(s) 50. Portable terminal 10 may be equipped with password generating unit(s) 21 which encrypt information including password generation user identifier(s) issued by authentication server(s) 50 and generate one-time password(s), encoding unit(s) 22 which encode one-time password(s) and generate baseband signal(s), carrier wave generating unit(s) 23 which generate carrier wave(s) in audible band(s), modulating unit(s) 25 which use baseband signal(s) to modulate carrier wave(s) and generate modulated signal(s), and speaker(s) 17 which transmit modulated signal(s) in the form of sound wave(s). One-time password(s) may be input as sound wave(s) from portable terminal(s) 10 to authentication terminal(s) 30.

18 Claims, 7 Drawing Sheets

(51) Int. Cl.
*G06Q 20/38* (2012.01)
*G06Q 20/40* (2012.01)
*H04L 9/32* (2006.01)
*H04W 12/06* (2009.01)
*H04W 12/02* (2009.01)

(52) U.S. Cl.
CPC .......... *G06Q20/4012* (2013.01); *H04L 9/3228* (2013.01); *H04W 12/06* (2013.01); *H04L 2209/80* (2013.01); *H04W 12/02* (2013.01)

(56) References Cited

U.S. PATENT DOCUMENTS

| | | | |
|---|---|---|---|
| 8,996,387 B2 * | 3/2015 | Stocker et al. | 704/275 |
| 9,077,800 B2 * | 7/2015 | Dragt | 1/1 |
| 2004/0133789 A1 * | 7/2004 | Gantman et al. | 713/189 |
| 2007/0250920 A1 * | 10/2007 | Lindsay | 726/7 |
| 2015/0089607 A1 * | 3/2015 | Hubner et al. | 726/6 |

FOREIGN PATENT DOCUMENTS

| | | | |
|---|---|---|---|
| JP | 2010-21777 A | | 1/2010 |
| KR | 2007090689 A | * | 9/2007 |
| WO | WO 2007091872 A2 | * | 8/2007 |

OTHER PUBLICATIONS

International Preliminary Report on Patentability (PCT/IB/373), including Written Opinion (PCT/ISA/237), in International Application No. PCT/JP2012/063247, of which the present application is a "bypass" continuation-in-part.

* cited by examiner

| Preamble | Preamble | Preamble | SOF | SC ID | Bank ID | Bank ID | CRC8 |
|---|---|---|---|---|---|---|---|
| Pkt No.1 | Data 1 | Data 2 | Data 3 | Data 4 | Data 5 | Data 6 | CRC8 |
| Pkt No.2 | Data 7 | Data 8 | Data 9 | Data 10 | Data 11 | Data12 | CRC8 |
| Pkt No.3 | Data 13 | Data 14 | Data 15 | Data 16 | 0x00 | 0xFF | CRC8 |

※Timing estimation : 30 ms × 4 packets = 120 ms

AUTHENTICATION SYSTEM AND AUTHENTICATION METHOD

CROSS-REFERENCE TO RELATED APPLICATION, PRIORITY CLAIMS, AND INCORPORATION BY REFERENCE

This application is a continuation-in-part of and claims benefit under 35 USC 120 and 365(c) to copending International Application No PCT/JP2012/063247, entitled "Authentication System and Authentication Method", filed 24 May 2012; and further claims benefit of priority under 35 USC 119(a)-(d) to Japanese Patent Application No 2011-132764, entitled "Authentication System and Authentication Method", filed 15 Jun. 2011, the contents of both of which applications are incorporated herein in their entireties by reference.

FIELD OF THE INVENTION

The present invention relates to an authentication system for carrying out authentication to determine whether a user who is using a terminal is a valid user, and in particular relates to an authentication system that uses a one-time password to carry out user authentication.

BACKGROUND

While authentication systems employing fixed passwords have conventionally been utilized in bank automated teller machine (ATM) systems, online banking systems, and various other types of authentication systems, to further improve security, authentication systems employing disposable one-time passwords have come to be used.

In an authentication system employing one-time passwords, each time that a prescribed period of time has elapsed, the password is changed and a password generation terminal (token) indicating same is distributed to the user, authentication being carried out as a result of manual input into the ATM by the user of the one-time password displayed at this terminal.

However, with conventional authentication systems, it being necessary that the one-time password which is input into the ATM or other such authentication terminal be input thereinto manually by the user, there has been occurrence of problems in that operations for input thereof are annoying, and in that erroneous input can result in unsuccessful authentication.

In light of such problems, one possible solution is to carry out input of a one-time password from a password generation terminal to an authentication device in audio fashion from a speaker of the password generation terminal to a microphone of the authentication device. By so doing, because there is no need to manually input the one-time password, this makes it possible to prevent the annoyance, input errors, and so forth that are associated with manual input.

In accordance with another possible solution, a one-time password might be converted into notes of a musical scale based on a prescribed conversion table, permitting authentication to be carried out based on differences between notes of musical scales. However, because musical scales permit expression of only a small amount of data and because it takes time to transmit notes of a musical scale, this might only allow passwords of small data size to be sent, which might result in lowered security.

Furthermore, at installation locations for authentication terminals and the like there are many noises such as sounds from the surrounding environment which can for example make it difficult to properly recognize musical scale notes at the receiver, this problem being aggravated by the fact that where only a small of data can be transmitted it may be difficult to carry out error correction, as a result of which there may be a high likelihood of occurrence of authentication errors and so forth.

The present invention was conceived in light of such problems, it being an object thereof to provide an authentication system which will make it possible to carry out authentication at high speed and with high accuracy in the context of an authentication system that uses sound to transmit one-time password(s).

SUMMARY OF INVENTION

To solve one or more of the foregoing problems, an authentication system in accordance with an embodiment of the present invention may be equipped with portable terminal(s), authentication terminal(s), and authentication server(s).

Authentication server(s) may provide information necessary for authentication to authentication terminal(s), and authentication server(s) may carry out user authentication of user(s) who perform operation(s) at authentication terminal(s) while using portable terminal(s).

Authentication server(s) may be equipped with storage unit(s). Storage unit at authentication server(s) may store, in associated fashion and separately for each user, password generation user identifier(s) for generating one-time password(s).

Portable terminal(s) may be equipped with storage unit(s). Storage unit at portable terminal(s) may store password generation user identifier(s), e.g., after password generation user identifier(s) have been issued by authentication server(s).

Portable terminal(s) may be equipped with password generating unit(s). Password generating unit(s) at portable terminal(s) may encrypt information including password generation user identifier(s) and/or time(s) to generate one-time password(s). Password generating unit(s) may perform hash function(s) on password generation user identifier(s) and/or time(s) to generate one-time password(s).

Portable terminal(s) may be equipped with encoding unit(s). Encoding unit(s) at portable terminal(s) may encode one-time password(s) and may generate baseband signal(s).

Encoding unit at portable terminal(s) may encode one one-time password(s) in the form of data frame(s). Data frame(s) may contain frame identifier(s) for distinguishing data frame(s) from other data frame(s).

Data frame may contain packet(s). Packet(s) may include packet identifier(s) for identifying packet(s). Packet may include data containing at least some portion(s) of one-time password(s).

Packet identifier(s) may be packet number(s) present at beginning of packet(s) in location(s) preceding data.

Portable terminal(s) may be equipped with carrier wave generating unit(s). Carrier wave generating unit(s) at portable terminal(s) may generate carrier wave(s) in audible band(s).

Portable terminal(s) may be equipped with modulating unit(s). Modulating unit(s) at portable terminal(s) may use baseband signal(s) to modulate carrier wave(s) and may generate modulated signal(s).

Modulating unit(s) may carry out modulation at modulation rate(s) that is or are 1/n (where n is or are natural number(s)) of audio sampling frequency or frequencies used by portable terminal(s).

Carrier wave(s) generated by carrier wave generating unit(s) may have frequency or frequencies that is or are m (where m is or are natural number(s)) times modulation rate(s).

Where there are three carrier waves, the three carrier waves may have respectively different frequencies. Where there are three carrier waves and one baseband signal, modulated signal(s) may be combined modulated signal(s) obtained by using the one baseband signal to modulate the three carrier waves. Where there are three carrier waves, the three carrier waves may respectively have frequencies of 8,820 Hz, 11,760 Hz, and 14,700 Hz.

Modulation rate(s) may be 1/15 of audio sampling frequency or frequencies. Frequency or frequencies of carrier wave(s) may be one or more species selected from among the group consisting of three, four, and five times modulation rate(s).

Modulation rate(s) may be on the order of 3 kHz. Frequency or frequencies of carrier wave(s) may be on the order of 12 kHz.

Modulation rate(s) may include 2,940 Hz. Frequency or frequencies of carrier wave(s) may include 8,820 Hz, 11,760 Hz, and 14,700 Hz.

Portable terminal may be equipped with speaker(s). Speaker(s) at portable terminal(s) may transmit modulated signal(s) as sound wave(s).

Authentication terminal(s) may be equipped with microphone(s). Microphone(s) at authentication terminal(s) may receive sound wave(s).

Authentication terminal(s) may be equipped with terminal authentication unit(s). Terminal authentication unit(s) may carry out user authentication. User authentication carried out by terminal authentication unit(s) may be performed based on result(s) of comparison of one-time password(s) obtained by demodulating and decoding received sound wave(s), and authentication one-time password(s) directly generated from password generation user identifier(s) stored in storage unit(s) at authentication server(s).

An authentication method in accordance with an embodiment of the present invention may be performed in the context of such authentication system(s) and may be for carrying out user authentication of user(s) who perform operation(s) at authentication terminal(s) while using portable terminal(s).

The authentication method may comprise password generating operation(s). Password generating operation(s) may take place at portable terminal(s). During password generating operation(s), information including password generation user identifier(s) issued by authentication server(s) may be encrypted and one-time password(s) may be generated.

The authentication method may comprise encoding/modulating operation(s). Encoding/modulating operation(s) may take place at portable terminal(s). During encoding/modulating operation(s), one-time password(s) may be encoded and baseband signal(s) may be generated. Baseband signal(s) may be used to modulate carrier wave(s) in audible band(s), and modulated signal(s) may be generated.

The authentication method may comprise transmitting operation(s). During transmitting operation(s), modulated signal(s) may be transmitted in the form of sound wave(s) from speaker(s) of portable terminal(s).

The authentication method may comprise receiving operation(s). During receiving operation(s), sound wave(s) may be received by microphone(s) at authentication terminal(s).

The authentication method may comprise demodulating/decoding operation(s). Demodulating/decoding operation(s) may take place at authentication terminal(s) and/or authentication server(s). During demodulating/decoding operation(s), received sound wave(s) may be demodulated and decoded to reconstitute one-time password(s).

The authentication method may comprise authentication one-time password generation operation(s). Authentication one-time password generation operation(s) may take place at authentication terminal(s) and/or authentication server(s). During authentication one-time password generation operation(s), authentication one-time password(s) may be directly generated from password generation user identifier(s) stored at authentication server(s).

The authentication method may comprise authentication operation(s). Authentication operation(s) may take place at authentication terminal(s) and/or authentication server(s). During authentication operation(s), reconstituted one-time password(s) and authentication one-time password(s) may be compared to carry out user authentication.

A one-time password transmission program in accordance with an embodiment of the present invention may cause computer(s) to transmit one-time password(s) in the form of sound wave(s).

The one-time password transmission program may cause computer(s) to execute password generating step(s). During password generating step(s), information including password generation user identifier(s) may be encrypted and one-time password(s) may be generated.

The one-time password transmission program may cause computer(s) to execute encoding step(s). During encoding step(s), one-time password(s) may be encoded and baseband signal(s) may be generated.

The one-time password transmission program may cause computer(s) to execute carrier wave generating step(s). During carrier wave generating step(s), carrier wave(s) in audible band(s) may be generated.

The one-time password transmission program may cause computer(s) to execute modulating step(s). During modulating step(s), baseband signal(s) may be used to modulate carrier wave(s), and modulated signal(s) may be generated.

The one-time password transmission program may cause computer(s) to execute transmitting step(s). During transmitting step(s), modulated signal(s) may be transmitted in the form of sound wave(s) from speaker(s).

Such an authentication system, method, and/or program in accordance with the present invention may make it possible to use sound to transmit one-time password(s) and may make it possible to carry out one-time password authentication at high speed and with high accuracy.

Other embodiments, systems, methods, and features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

An authentication system, which is an embodiment of the present invention, will be described in detail hereinbelow with reference to the drawings. In the context of an authentication system employing a one-time password (OTP), the present embodiment is characterized in that input of a one-time password into an authentication terminal from a portable terminal serving as one-time password generator (token) which might be carried on the person of a user is performed by means of sound wave communication in which information in the form of sound wherein air serves as medium is conveyed in one-way fashion. Note that the present embodiment will be described in terms of an example in which a user utilizing a bank automated teller machine (ATM) uses his or her own mobile telephone to carry out authentication.

Figure 1:
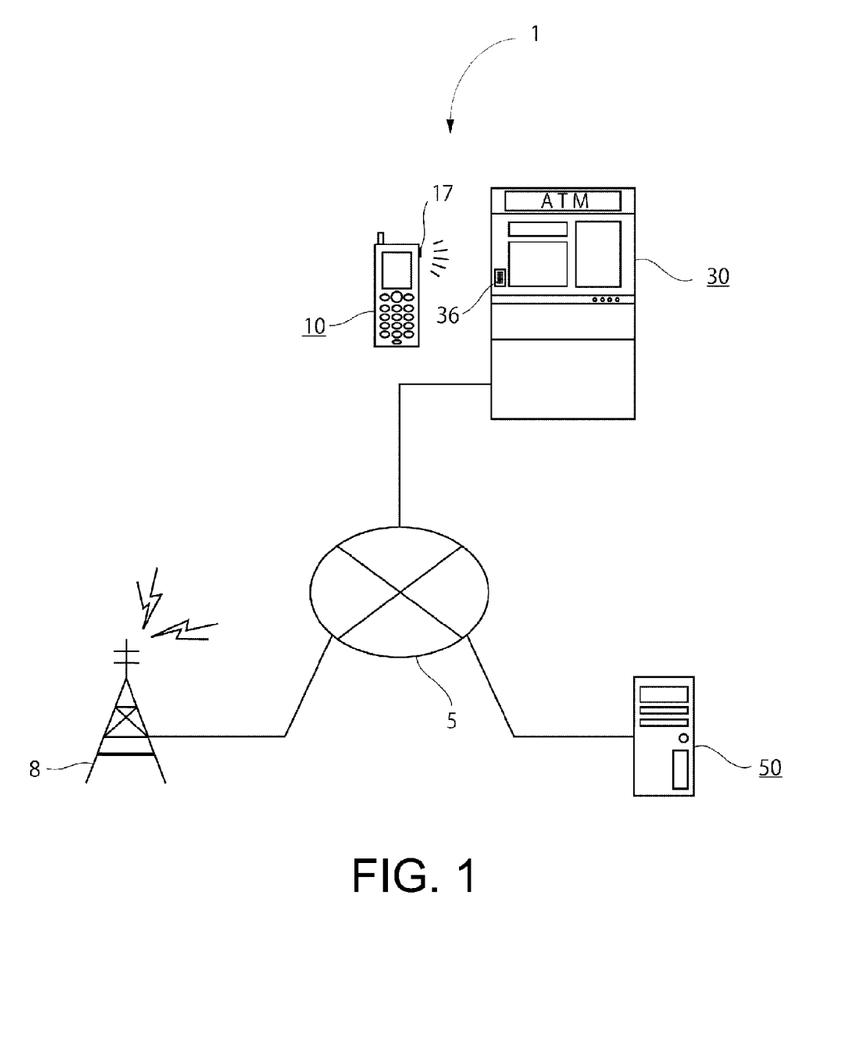
FIG. 1 is a schematic diagram showing in simplified fashion the constitution of an authentication system associated with an embodiment of the present invention.

The constitution of an authentication system will first be described with reference to FIG. 1. FIG. 1 is a schematic diagram showing in simplified fashion the constitution of an authentication system associated with the present embodiment. As shown in FIG. 1, authentication system 1 is provided with portable terminal 10 which is in the possession of a user being authenticated; authentication terminal 30 which is used by the user being authenticated; and authentication server 50 which provides information necessary for authentication to authentication terminal 30.

Authentication terminal 30 and authentication server 50 are connected to network 5 which may be the Internet or a leased line or the like, and portable terminal 10 is connected to network 5 by way of wireless base station 8.

Figure 2:
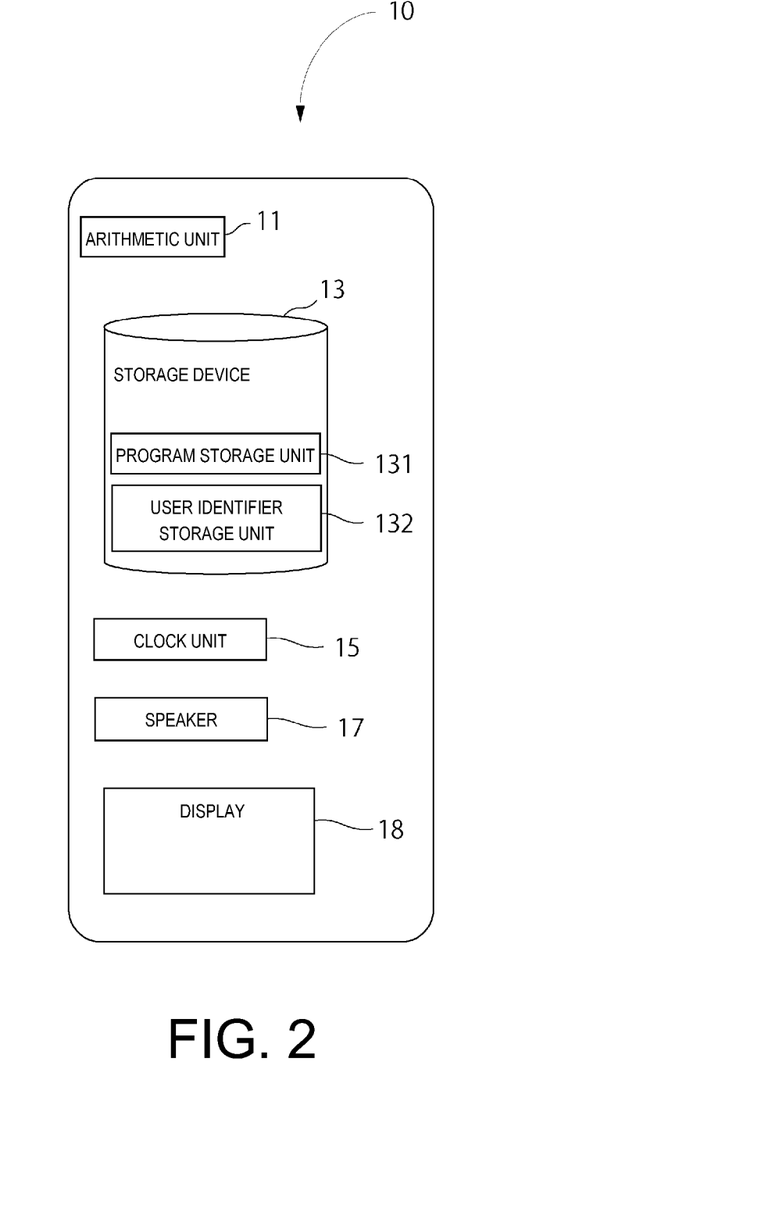
FIG. 2 is a schematic diagram showing in simplified fashion the constitution of a portable terminal associated with an embodiment of the present invention.
Figure 3:
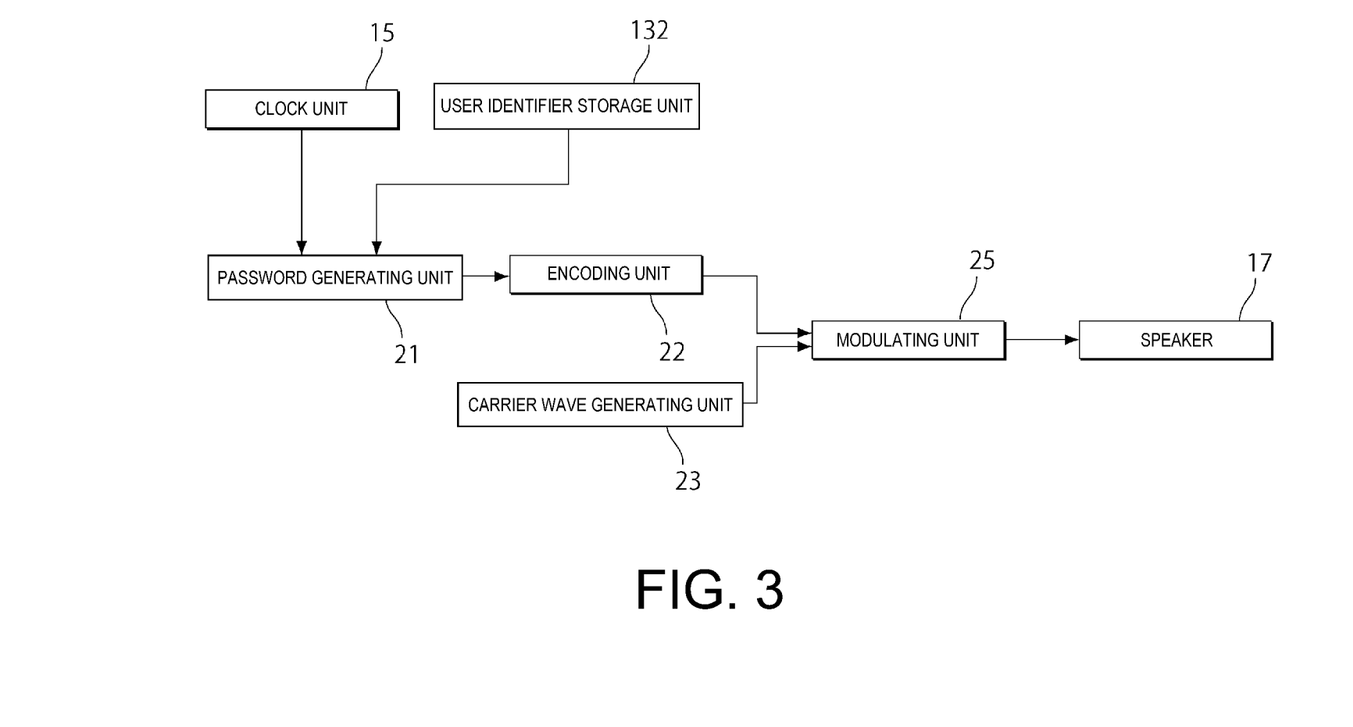
FIG. 3 is a block diagram showing in simplified fashion the functionalities at a portable terminal associated with an embodiment of the present invention.
Figure 4:
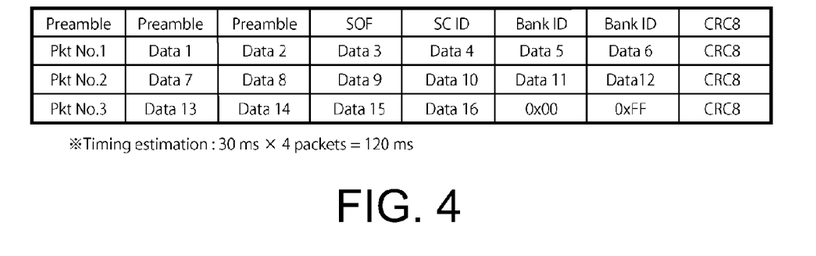
FIG. 4 is a drawing showing an encoded data frame structure associated with an embodiment of the present invention.

The constitution of portable terminal 10 will next be described with reference to FIG. 2 through FIG. 4. FIG. 2 is a schematic diagram showing in simplified fashion the constitution of the portable terminal associated with the present embodiment, and FIG. 3 is a block diagram showing in simplified fashion the functionalities at the portable terminal associated with the present embodiment. FIG. 4 is a drawing showing an encoded data frame structure as may be employed at the portable terminal associated with the present embodiment.

As shown in FIG. 2, portable terminal 10 is provided with CPU(s) or other such arithmetic unit(s) 11 which carry out various types of operations; storage device(s) 13 comprising RAM which functions as work area(s) for arithmetic processing, flash memory or memories that store various types of information, and so forth; clock unit(s) 15 for calculating time; speaker(s) 17 for causing electrical signals to be transmitted as sound pressure oscillations; and display(s) 18 for displaying various types of information.

Storage device 13 is provided with program storage unit 131 which stores various programs for executing prescribed processing, described below, at portable terminal 10; and user identifier storage unit 132 which stores password generation user identifiers (abbreviated herein for convenience as "PW generation user identifiers" and serving in some embodiments as an example of second user identifiers) for generating one-time passwords issued by authentication server 50.

While the present embodiment employs a mobile telephone as portable terminal 10, so long as it is a terminal which is provided with a speaker for transmitting sound and which is capable of communicating with authentication server 50 by way of network 5, it is possible to employ therefor any of various types of terminals, including portable PCs, personal digital assistants (PDAs), tablet computers, net books, video games, and so forth.

As shown in FIG. 3, portable terminal 10 is provided with password generating unit(s) 21, encoding unit(s) 22, carrier wave generating unit(s) 23, and modulating unit(s) 25. The functionalities of these respective units are implemented as a result of execution by arithmetic unit 11 of various programs within program storage unit 131.

Password generating unit 21 has functionality permitting generation of one-time password(s) for performing user authentication at authentication terminal 30 based on current time(s) obtained from clock unit 15 and based on PW generation user identifier(s) obtained from user identifier storage unit 132.

More specifically, password generating unit 21 might perform a hash function (e.g., MD5=Message Digest Algorithm 5) on the current time and the PW generation user identifier, and cause the hash value obtained to be used as the one-time password (e.g., 128 bits if MD5).

Note that whereas the present embodiment employs as one-time password a time-synchronization-type one-time password in which a one-time password is generated based on the current time, other types of one-time passwords may be used. Furthermore, the current time based on which the one-time password is generated preferably makes use of times which are in units of minutes.

Encoding unit 22 preferably attaches error-correcting code to the one-time password generated by password generating unit 21 and so forth as it encodes the one-time password in the form of a data frame.

As shown in FIG. 4, a data frame shown associated with the present embodiment is preferably made up of four packets, the packet in the first row being constituted from a preamble for synchronization of timing, which is followed by an SOF (Start Of Frame) for identifying the start of the frame, a frame identifier (SC ID) for distinguishing this date frame from other data frames, a bank identifier (Bank ID) for identifying the bank, and a CRC8 (Cyclic Redundancy Check) for error correction.

By thus including a frame identifier in the data frame, it is possible to prevent interference with other data frames; e.g., interference with data frames transmitted by a portable terminal 10 of another user who is operating a neighboring ATM.

The packets in the second through fourth rows preferably each have a packet number (Pkt No) at the beginning and a CRC8 checksum at the end, with one-time password data (data1, data2, data3, . . . ) being present therebetween. Where sound wave communication is employed, ambient noise, reverberations, and so forth may cause signal-to-noise ratios to be low, such that there is increased tendency for decoding errors to occur; and such that when a decoding error does occur it will often be difficult to identify the location of the error. By therefore causing a packet number which serves as packet identifier to be present at the beginning of each packet, this makes it possible to identify the locations of errors, to improve the efficiency with which error correction is carried out, and to increase decoding accuracy.

Carrier wave generating unit 23 generates carrier wave(s) (sometimes abbreviated as simply "carrier(s)") on which encoded one-time password(s) are made to ride as they are transmitted. The present embodiment makes use of a three-wave carrier technique employing the three carrier waves having carrier frequencies fc of 8,820 Hz, 11,760 Hz, and 14,700 Hz.

Modulating unit 25 uses the one-time password which was encoded as data frame(s) at encoding unit 22, i.e., the baseband signal, to modulate carrier wave(s) generated by carrier wave generating unit 23. The modulation rate (baud rate) at modulating unit 25 is 2,940 Hz. As modulation technique, it is possible for example to employ single-sideband (SSB) modulation, binary phase-shift keying (BPSK) modulation, quadrature phase-shift keying (QPSK) modulation, and/or the like.

Furthermore, as the present embodiment utilizes the three-wave carrier technique, modulating unit 25 modulates the three carrier waves with the same baseband signal to generate modulated signals, following which these are combined to generate a combined modulated signal.

By thus modulating three carrier waves with the same baseband signal and causing the signals to be conveyed in parallel fashion, it is possible to greatly improve the accuracy with which the signals are received. Furthermore, employment of three carrier waves of different frequencies provides the benefit whereby the sounds of the carrier waves are less likely to be detected by the ear.

Modulated signal(s) generated at modulating unit 25 are transmitted in air as sound pressure oscillations, i.e., as sound code, from speaker(s) 17. In the present embodiment, as one example to optimize transmission time and improve the likelihood of successful reception under practical conditions with a handheld portable terminal, the combined modulated signal might be recorded in cyclical and repeating fashion for a suitable time not more than on the order of, e.g., one second, as an audio data file (way file or the like), and this audio data file might thereafter be played on the order of, e.g., five times (for 5 seconds of playback in the present example) to transmit the sound code from the speaker(s).

Here, the reason for employing the foregoing frequencies as modulation rate and carrier frequencies fc is to minimize load on arithmetic unit(s) 11 at portable terminal 10 during processing for transmission of sound code, i.e., sound. It has often been the case in recent years that the chips installed in mobile telephones employ an audio signal sampling frequency of 44.1 kHz or 48 kHz. Where sampling frequency conversion is in a whole number ratio relative to such sampling frequency frequencies it will be possible to minimize load during processing for transmission of sound code.

In the present embodiment, assuming an audio signal sampling frequency of 44.1 kHz at portable terminal 10, to achieve a modulation rate on the order of 3 kHz, a modulation rate of 2,940 Hz was therefore chosen, this being 1/15th of the sampling frequency. Furthermore, to achieve carrier frequencies fc on the order of 12 kHz, carrier frequencies of 8,820 Hz, 11,760 Hz, and 14,700 Hz were chosen, these being respectively three times, four times, and five times the modulation rate.

At portable terminal 10, by thus choosing modulation rate(s) that is or are 1/n (where n is a natural number) of audio signal sampling frequency or frequencies at portable terminal 10, and choosing frequency or frequencies of carrier wave(s) that is or are m (where m is a natural number) times modulation rate(s), sampling frequency conversion of the sort which would place a high load on processing capability is made unnecessary, and it will be possible to employ software processing to carry out processing for transmission of sound code using existing smartphones and other such mobile telephones without the need to provide these with special-purpose circuitry or the like.

Moreover, if a one-time password generating program is installed at portable terminal 10, to cause portable terminal 10 to carry out processing for transmission of a one-time password in the form of a sound wave, the one-time password generating program might automatically acquire the sampling frequency of audio signals at portable terminal 10, and might automatically determine modulation rate and carrier frequencies as described above based on the sampling frequency which was acquired.

Figure 5:
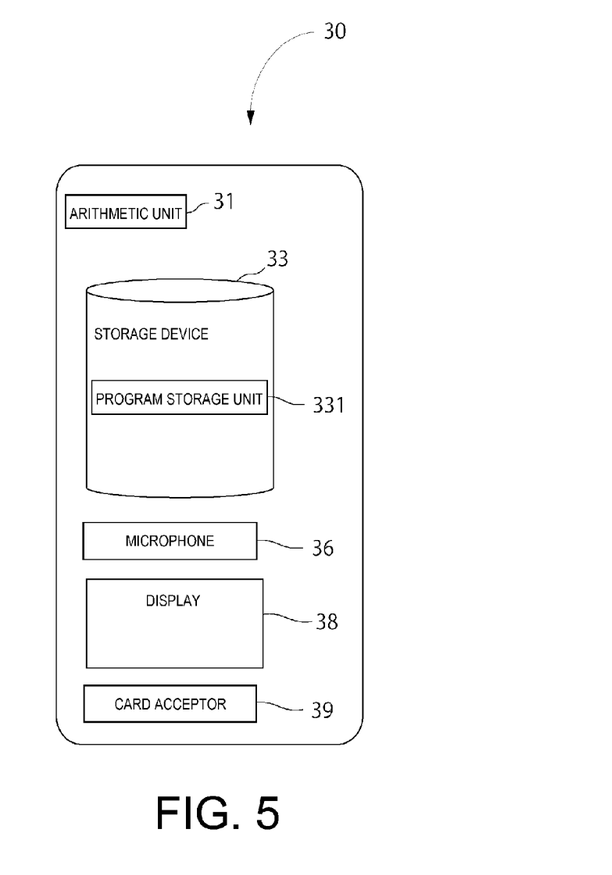
FIG. 5 is a schematic diagram showing in simplified fashion the constitution of an authentication terminal associated with an embodiment of the present invention.
Figure 6:
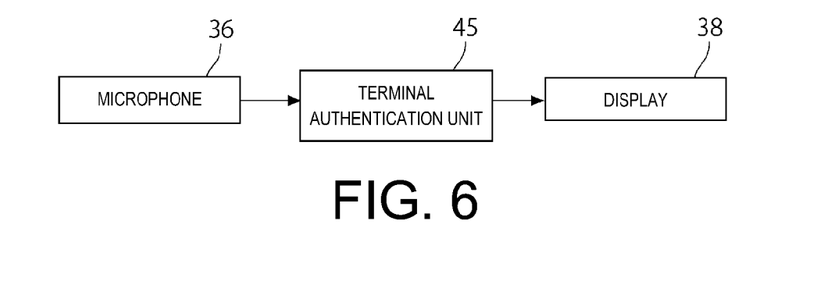
FIG. 6 is a block diagram showing in simplified fashion the functionalities at an authentication terminal associated with an embodiment of the present invention.

The constitution of authentication terminal 30 will next be described with reference to FIG. 5 and FIG. 6. FIG. 5 is a schematic diagram showing in simplified fashion the constitution of an authentication terminal associated with the present embodiment. FIG. 6 is a block diagram showing in simplified fashion the functionalities at an authentication terminal associated with the present embodiment.

As shown in FIG. 5, authentication terminal 30 is provided with CPU(s) or other such arithmetic unit(s) 31 which carry out various types of operations; storage device(s) 33 comprising RAM which functions as work area(s) for arithmetic processing, flash memory or memories that store various types of information, and so forth; microphone(s) 36 for causing the sound pressure oscillations of the aforementioned sound code to be received and converted into electrical signals; display(s) 38 for displaying various types of information; and card acceptor(s) 39 for accepting cash card(s).

Storage device 33 is provided with program storage unit 331 which stores various programs for executing prescribed processing, described below, at authentication terminal 30. While in the present embodiment authentication terminal 30 is an ATM which is installed at a bank storefront, so long as it is a terminal which is such that authentication involving one-time password(s) is carried out for use thereof by user(s), authentication terminal 30 may for example be a PC or the like which is used to gain access to online banking services.

As shown in FIG. 6, authentication terminal 30 is provided with terminal authentication unit 45, the functionalities of terminal authentication unit 45 being implemented as a result of execution by arithmetic unit 31 of various programs within program storage unit 331.

Terminal authentication unit 45 carries out user authentication to determine whether a one-time password obtained when sound code received by microphone 36 is demodulated and decoded is that of a valid user.

More specifically, based on the financial institution code of the cash card inserted within card acceptor 39, terminal authentication unit 45 communicates with an authentication server 50 of the bank which issued the cash card (the bank which issues the one-time password), and transmits the card number and audio data of the sound code which was received to said authentication server 50. The card number, which is the number of the cash card that the user inserted within card acceptor 39 in order to be able to use authentication terminal 30, is a first user identifier for identifying the user.

Terminal authentication unit 45 then receives from authentication server 50 the results of authentication by the server to determine whether the one-time password which was reconstituted from the sound code in question is that of a valid user. If it is determined as a result of authentication by the server that the one-time password is that of a valid user, terminal authentication unit 45 causes information indicating that authentication was successful to be displayed at display 38, and carries out control so as to permit use, e.g., operations for withdrawal of cash or the like, of authentication terminal 30 by the user in question.

Conversely, if it is determined as a result of authentication by the server that the one-time password which was input is not that of a valid user, terminal authentication unit 45 causes information indicating that authentication was unsuccessful to be displayed at display 38, and carries out control so as to thereafter not permit use of authentication terminal 30 by the user in question.

Figure 7:
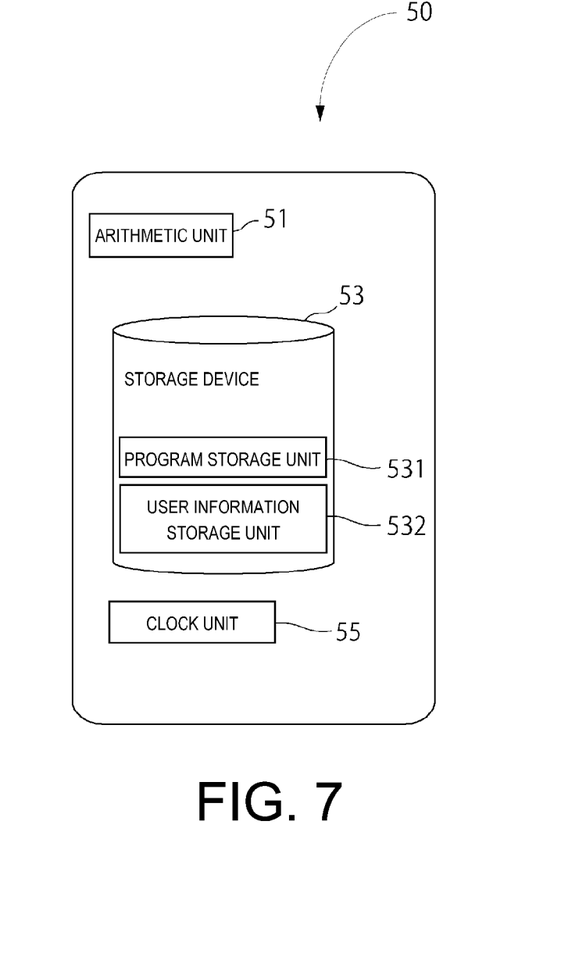
FIG. 7 is a schematic diagram showing in simplified fashion the constitution of an authentication server associated with an embodiment of the present invention.
Figure 8:
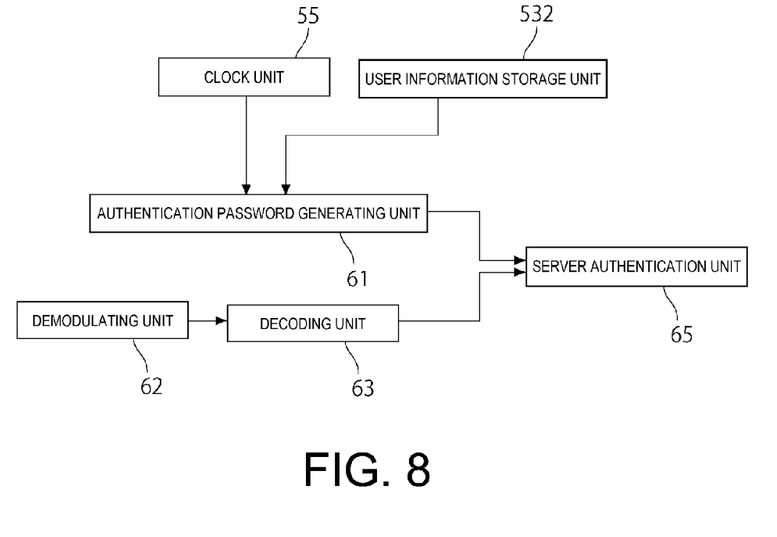
FIG. 8 is a block diagram showing in simplified fashion the functionalities at an authentication server associated with an embodiment of the present invention.

The constitution of authentication server 50 will next be described with reference to FIG. 7 and FIG. 8. FIG. 7 is a schematic diagram showing in simplified fashion the constitution of an authentication server associated with the present embodiment. FIG. 8 is a block diagram showing in simplified fashion the functionalities at an authentication server associated with the present embodiment.

Authentication server 50, which is a server for authentication of one-time passwords belonging to various banks, is, as shown in FIG. 7, provided with CPU(s) or other such arithmetic unit(s) 51 which carry out various types of operations; storage device(s) 53 comprising RAM which functions as work area(s) for arithmetic processing, hard disk drive(s) that store various types of information, and so forth; and clock unit(s) 55 for calculating time.

Storage device 53 is provided with program storage unit 531 which stores various programs for executing prescribed processing, described below, at authentication server 50; and user information storage unit 532 which stores, in associated fashion and separately for each user, card number(s) of cash card(s) (first user identifier(s)), PW generation user identifier(s) (second user identifier(s)), and authentication terminal identifier(s).

As shown in FIG. 8, authentication server 50 is provided with authentication password generating unit 61, demodulating unit 62, decoding unit 63, and server authentication unit 65; the functionalities of these respective units being implemented as a result of execution by arithmetic unit 51 of various programs within program storage unit 531.

Authentication password generating unit 61, which has functionality for directly generating authentication one-time password(s), directly generates authentication one-time password(s) from PW generation user identifier(s) obtained from user information storage unit(s) 532 based on card number(s) received from authentication terminal(s) 30, and current time(s) obtained from clock unit(s) 55.

Note that direct generation of one-time password(s) described in the present embodiment as occurring, for example, at authentication server 50 refers to generation of password(s) directly from PW generation user identifier(s) as distinguished from reconstitution of password(s) in sound code sent from portable terminal 10 to authentication server 50 by way of authentication terminal 30. Similarly, an authentication one-time password as described herein is a password directly generated by authentication server 50, for example, as distinguished from a password reconstituted from sound code sent from portable terminal 10 to authentication server 50 by way of authentication terminal 30.

Moreover, in addition to the current time, authentication password generating unit 61 may also use a time which is one minute before the current time and a time which is one minute after the current time to generate a total of three authentication one-time passwords.

Demodulating unit 62 demodulates the audio data of the sound code, i.e., the modulated signal(s), received from authentication terminal 30 and reconstitutes the baseband signal. Decoding unit 63 decodes the baseband signal and reconstitutes the one-time password which was transmitted from portable terminal 10.

Server authentication unit 65 carries out server-based authentication to determine whether this one-time password which was reconstituted at decoding unit 63 agrees with any of the authentication one-time password(s) (three in the present example, as described above) generated by authentication password generating unit 61.

If the reconstituted one-time password agrees with any of the authentication one-time passwords, server authentication unit 65 deems that the reconstituted one-time password is that of a valid user, and transmits this fact to authentication terminal 30 as the result of authentication. Conversely, if the reconstituted one-time password does not agree with any of the authentication one-time passwords, server authentication unit 65 deems that the reconstituted one-time password is not that of a valid user, and transmits this fact to authentication terminal 30 as the result of authentication.

Figure 9:
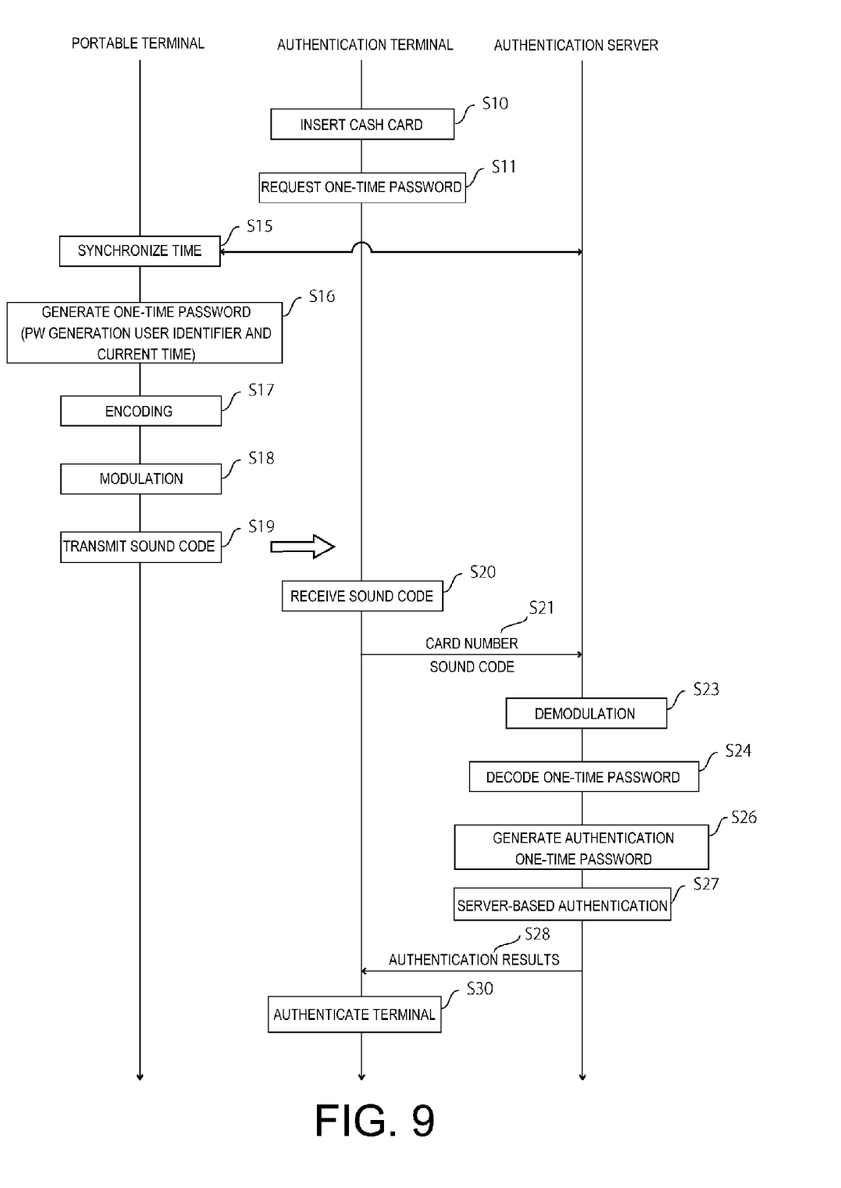
FIG. 9 is a flowchart showing flow of authentication processing in an authentication system associated with an embodiment of the present invention.

Detailed description of the constitution of authentication system 1 having been given above, description of the flow of processing for authentication of a one-time password that might take place in the context of authentication system 1 is next given with reference to FIG. 9. FIG. 9 is a flowchart showing flow of processing for authentication of a one-time password in the context of the present embodiment.

Note that prior to using his or her own portable terminal 10 to carry out authentication at authentication terminal 30, it will be assumed in the present embodiment that the user has previously carried out user registration at authentication server 50, and has previously obtained a PW generation user identifier which has been stored at user identifier storage unit 132 of portable terminal 10.

To carry out user registration, the user might use portable terminal 10 to communicate with authentication server 50 by way of network 5, and might input the password and the card number of the cash card. The password and card number thus input by the user might be transmitted to authentication server 50 along with terminal identifier(s) of the mobile telephone. As such terminal identifier(s), the User Identification (UID), International Mobile Equipment Identity IMEI), and/or the like might be used. Upon receiving these, authentication server 50 might transmit a PW generation user identifier to portable terminal 10, and might also cause the card number (serving as first user identifier in the present example), the PW generation user identifier (serving as second user identifier in the present example), the terminal identifier(s), and the password to be stored at user information storage unit 532 in such fashion that these are stored separately for and/or in association with each user.

After the user has performed user registration, at a time when the user makes a cash withdrawal or the like from an ATM or other such authentication terminal 30, the authentication processing shown in FIG. 9 is executed.

Referring to FIG. 9, at S10, the user inserts a cash card into card acceptor 39 of authentication terminal 30. Upon so doing, at S11, authentication terminal 30 requests input of the one-time password from the user. This request might be carried out by voice and/or by causing a message to be displayed at display 38.

In response to this request, the user performs operations at portable terminal 10 to cause generation and output of a one-time password therefrom; as a result of which, at S15, portable terminal 10 causes the current time which will be used for generation of the one-time password to be synchronized with authentication server 50. In implementing this time synchronization, portable terminal 10 communicates with authentication server 50 by way of base station 8 and network 5.

Processing then proceeds to S16, where password generating unit 21 of portable terminal 10 generates a one-time password based on the current time obtained from clock unit 15 and based on the PW generation user identifier obtained from user identifier storage unit 132.

At S17, the one-time password which has been generated is encoded in the form of a data frame at encoding unit 22. At S18, modulating unit 25 uses the encoded data as baseband signal to modulate carrier wave(s). The modulated signal is transmitted in the form of sound code from speaker 17 in such fashion that it is directed toward microphone 36 of authentication terminal 30 (S19).

At a time when sound code is being transmitted at S19, if portable terminal 10 and authentication terminal 30 are far apart, because there is a possibility that attenuation of sound pressure with distance may make it difficult for decoding to occur at authentication terminal 30, it is desirable that transmission of the sound code which conveys the one-time password be made to occur after the user has placed speaker 17 of portable terminal 10 at a prescribed location which is near microphone 36 of authentication terminal 30.

Because, as described above, the present embodiment employs 8,820 Hz, 11,760 Hz, and 14,700 Hz, which are frequencies within the audible band, as carrier waves for sound code, the user is able to discern with his or her own ear when sound code is being transmitted. Moreover, when sound code is being transmitted, a ring tone indicating this fact might be emitted from portable terminal 10.

Next, after reception of sound code by authentication terminal 30 at S20, processing proceeds to S21, where the card number of the cash card which was inserted and the sound code audio data are transmitted to the authentication server 50 of the bank that issued the cash card in question.

At S23, after receiving these, demodulating unit 62 of authentication server 50 demodulates the received signal while carrying out error correction and so forth thereon to obtain the baseband signal having a frame structure. At S24, decoding unit 63 decodes the baseband signal to obtain the one-time password.

Furthermore, at S26, authentication password generating unit 61 generates authentication one-time password(s) based on the current time obtained from clock unit 55 and based on the PW generation user identifier stored at user information storage unit 532 in associated fashion with respect to the card number received at S21.

In addition, processing proceeds to S27, where server authentication unit 65 carries out server-based authentication to determine whether the one-time password obtained from authentication terminal 30 agrees with any of the aforementioned authentication one-time password(s) (three in the present example, as described below); the user who is operating authentication terminal 30 is deemed to be a valid user if these agree, but is deemed to not be a valid user if these do not agree.

Note that in the present embodiment not only is an authentication one-time password generated based on the current time but authentication one-time passwords are also generated based on a time which is one minute before the current time and based on a time which is one minute after the current time, authentication being carried out using three authentication one-time passwords, as a result of which it is possible for authentication to be properly carried out even in such circumstances as when it takes time for transmission of the one-time password by the user.

At S28, the result of server-based authentication is sent to authentication terminal 30. At S30, after receiving the result of authentication, authentication terminal 30 causes terminal processing to be carried out such that the result of authentication is displayed at display 38, and in addition, terminal authentication unit 45 carries out control so as to cause subsequent terminal operations performed by the user in question to be accepted if the result of authentication that was received indicates a valid user, and so as to cause subsequent terminal operations performed by the user to not be accepted if the result of authentication that was received indicates an invalid user.

As described in detail above, the present embodiment makes it possible for one-time password(s) for authentication to be transmitted in the form of sound waves from portable terminal(s) to authentication terminal(s) without having to be manually input into authentication terminal(s), making it possible to prevent erroneous authentication due to input errors.

Furthermore, in accordance with the present embodiment, one-time password(s) are encoded, and one-time password(s) are transmitted as a result of using encoded data to modulate carrier wave(s), making it possible to increase the rate at which transmission is carried out, and making it possible to carry out sound wave communication which is of high accuracy and which permits processing for error correction and so forth.

Furthermore, in accordance with the present embodiment, authentication terminal(s) which receive one-time password(s) from portable terminal(s) transmit one-time password(s) to authentication server(s) in the form in which received as audio data—demodulation, decoding, generation of authentication one-time password(s), one-time password authentication, and so forth being carried out at authentication server(s)—as a result of which the processing load on authentication terminal(s) is small.

This makes it possible to easily add the functionalities of the present authentication system as new features to existing ATMs, PCs, and so forth. Furthermore, by thus causing authentication to be carried out almost entirely at authentication server(s), this makes it possible to dispense with the need to transmit PW generation user identifier(s) to authentication terminal(s), making it possible to ensure adequate security.

While embodiments of the present invention have been described above, modes of carrying out the present invention are not limited to the foregoing embodiments, a great many further variations being possible without departing from the gist of the present invention.

For example, functionalities of the aforementioned authentication server might be caused to be carried out not by a single server but by a plurality of servers acting in distributed fashion.

Furthermore, issuance of PW generation user identifier(s) from authentication server(s) to portable terminal(s) might be carried out not by way of network(s) but by way of recording media or the like.

Furthermore, whereas in the foregoing embodiment processing for transmission of one-time password(s) at portable terminal(s) was carried out by means of software processing, this might be carried out in hardware through use of one-time password generator(s) incorporating circuitry for implementation of the various functionalities thereof. This being the case, the term "unit" as used herein and in the attached drawings should, for example, be understood to apply as appropriate to software programming or to hardware components, or to any suitable mixture or combination thereof.

Furthermore, whereas in the foregoing embodiment processing for demodulating and decoding sound code, for generating authentication one-time password(s), for comparing authentication one-time password(s) to one-time password(s) input by user(s), and so forth was carried out at authentication server(s), some or all of such processing may be carried out at authentication terminal(s).

EXPLANATION OF REFERENCE NUMERALS

1 Authentication system
5 Network
10 Portable terminal
11 Arithmetic unit
13 Storage device
131 Program storage unit
132 User identifier storage unit
15 Clock unit
17 Speaker
21 Password generating unit
22 Encoding unit
23 Carrier wave generating unit
25 Modulating unit
30 Authentication terminal
31 Arithmetic unit
33 Storage device
331 Program storage unit
36 Microphone
39 Card acceptor
45 Terminal authentication unit
50 Authentication server
51 Arithmetic unit
53 Storage device
531 Program storage unit
532 User information storage unit
55 Clock unit
61 Authentication password generating unit
62 Demodulating unit
63 Decoding unit
65 Server authentication unit

What is claimed is:

1. An authentication system comprising:
at least one portable terminal;
at least one authentication terminal; and
at least one authentication server;
wherein the at least one authentication server:
provides information necessary for authentication to the at least one authentication terminal,
carries out user authentication of at least one user who performs at least one operation at the at least one authentication terminal while using the at least one portable terminal,
has a storage unit that stores, in associated fashion and separately for each of the at least one user, at least one password generation user identifier for generating at least one one-time password;
wherein the at least one portable terminal has:
at least one storage unit that stores the at least one password generation user identifier,
at least one password generating unit that encrypts information including the at least one password generation user identifier and that generates the at least one one-time password,
at least one encoding unit that encodes the at least one one-time password and generates at least one baseband signal,
at least one carrier wave generating unit that generates at least one carrier wave in at least one audible band,
at least one modulating unit that uses the at least one baseband signal to modulate the at least one carrier wave and generate at least one modulated signal, and
at least one speaker that transmits the at least one modulated signal as at least one sound wave; and
wherein the at least one authentication terminal has:
at least one microphone that receives the at least one sound wave, and
at least one terminal authentication unit that carries out user authentication based on at least one result of comparison of the at least one one-time password which is obtained by demodulating and decoding the at least one sound wave received thereby, and at least one authentication one-time password which is directly generated from the at least one password generation user identifier stored in the storage unit of the at least one authentication server.

2. The authentication system according to claim 1 wherein the at least one encoding unit of the at least one portable terminal encodes the at least one one-time password in the form of at least one first data frame.

3. The authentication system according to claim 2 wherein the at least one first data frame contains at least one frame identifier for distinguishing the at least one first data frame from at least one second data frame.

4. The authentication system according to claim 2 wherein the at least one first data frame contains at least one packet, the at least one packet including
at least one packet identifier for identifying the packet, and
at least one set of data containing at least a portion of the at least one one-time password.

5. The authentication system according to claim 4 wherein the at least one packet identifier is at least one packet number present at the beginning of the at least one packet in at least one location preceding the at least one set of data.

6. The authentication system according to claim 1 wherein the at least one modulating unit carries out modulation at at least one modulation rate that is 1/n (where n is at least one natural number) of at least one audio sampling frequency used by the at least one portable terminal; and
the at least one carrier wave generated by the at least one carrier wave generating unit has at least one frequency that is m (where m is at least one natural number) times the at least one modulation rate.

7. The authentication system according to claim 1 wherein there are a plurality of the at least one carrier wave in the at least one audible band.

8. The authentication system according to claim 7 wherein there are three of the at least one carrier wave in the at least one audible band, the three carrier waves having respectively different frequencies.

9. The authentication system according to claim 8 wherein there is one of the at least one baseband signal, and
the at least one modulated signal is a combined modulated signal obtained by using the one baseband signal to modulate the three carrier waves.

10. The authentication system according to claim 9 wherein the three carrier waves respectively have frequencies of 8,820 Hz, 11,760 Hz, and 14,700 Hz.

11. The authentication system according to claim 6 wherein the at least one modulation rate is $\frac{1}{15}$ of the at least one audio sampling frequency.

12. The authentication system according to claim 6 wherein the at least one frequency of the at least one carrier wave is one or more species selected from among the group consisting of three, four, and five times the at least one modulation rate.

13. The authentication system according to claim 6 wherein
the at least one modulation rate is on the order of 3 kHz, and
the at least one frequency of the at least one carrier wave is on the order of 12 kHz.

14. The authentication system according to claim 13 wherein the at least one modulation rate includes 2,940 Hz.

15. The authentication system according to claim 13 wherein the at least one frequency of the at least one carrier wave includes 8,820 Hz, 11,760 Hz, and 14,700 Hz.

16. The authentication system according to claim 1 wherein
the at least one storage unit of the at least one authentication server stores, in associated fashion and separately for each of the at least one user, at least one first user identifier, input of which to the at least one authentication terminal is requested so that user authentication may be carried out;
the at least one authentication server is equipped with
at least one demodulating/decoding unit that demodulates and decodes the at least one sound wave received from the at least one authentication terminal and reconstitutes the at least one one-time password;
at least one authentication password generating unit that generates the at least one authentication one-time password from the at least one password generation user identifier stored at the at least one storage unit of the at least one authentication server based on the at least one first user identifier input at the at least one authentication terminal by the at least one user; and
at least one server authentication unit that compares the at least one reconstituted one-time password and the at least one authentication one-time password;
wherein the at least one terminal authentication unit of the at least one authentication terminal carries out user authentication based on at least one result of the comparison by the at least one server authentication unit.

17. The authentication system according to claim 1 wherein the information encrypted by the at least one password generating unit to generate the at least one one-time password further includes at least one time.

18. The authentication system according to claim 17 wherein the at least one password generating unit performs at least one hash function on the at least one password generation user identifier and the at least one time to generate the at least one one-time password.

* * * * *